United States Patent [19]

Avelange et al.

[11] Patent Number: 5,123,067

[45] Date of Patent: Jun. 16, 1992

[54] OPTICAL HEAD CAPABLE OF BEING FITTED INTO A HYBRID CIRCUIT

[75] Inventors: Gérôme Avelange, Barbizon; Thierry Gouvernel, Moncourt-Fromowville, both of France

[73] Assignee: Thomson Hybrides, Puteaux, France

[21] Appl. No.: 611,893

[22] Filed: Nov. 13, 1990

[30] Foreign Application Priority Data

Nov. 21, 1989 [FR] France .................. 89 15239

[51] Int. Cl.⁵ .................. G02B 6/00; G02B 6/36
[52] U.S. Cl. .................................. 385/14
[58] Field of Search ............... 350/96.20, 96.22

[56] References Cited

U.S. PATENT DOCUMENTS

| 4,695,120 | 9/1987 | Holder | 350/96.11 |
| 4,803,361 | 2/1989 | Aiki et al. | 250/227 |

FOREIGN PATENT DOCUMENTS

| 0238977 | 9/1987 | European Pat. Off. |
| 3809396 | 10/1989 | Fed. Rep. of Germany |
| 2581768 | 11/1986 | France |

OTHER PUBLICATIONS

Patent Abstracts of Japan, vol. 11, No. 395, Dec. 24, 1987, & JP-A-62-159105, Jul. 15, 1987, K. Imoto, "Optical Module for Bi-Directional Transmission".

*Primary Examiner*—Akm Ullah
*Attorney, Agent, or Firm*—Oblon, Spivak, McClelland, Maier & Neustadt

[57] ABSTRACT

An optic head designed to be fitted into a hybrid circuit. This optic head includes at least one optoelectronic semiconductor assembly and one optic fiber in alignment. In order to attach it to a hybrid circuit, the elements are all mounted on a metal wafer which serves as a reference plane. The fiber is brazed or bonded to the wafer by means of a metal tube which supports a lens. Optic head has a second optoelectronic assembly also fixed to the metal wafer, a dichroic mirror or a semi-reflecting plate sends the light beam back to the second assembly. A filter may be provided to improve the separation of the light beams. The present invention finds application to multiplexers, demultiplexers, duplexers and optic couplers.

12 Claims, 2 Drawing Sheets

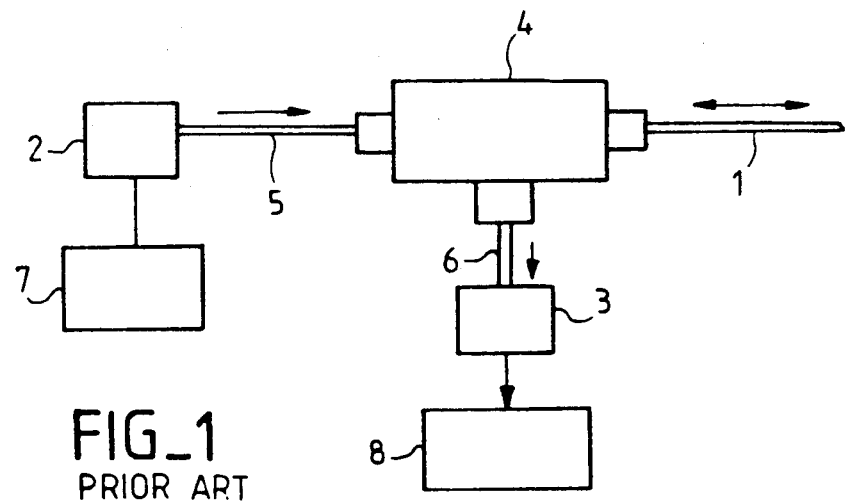
FIG_1
PRIOR ART
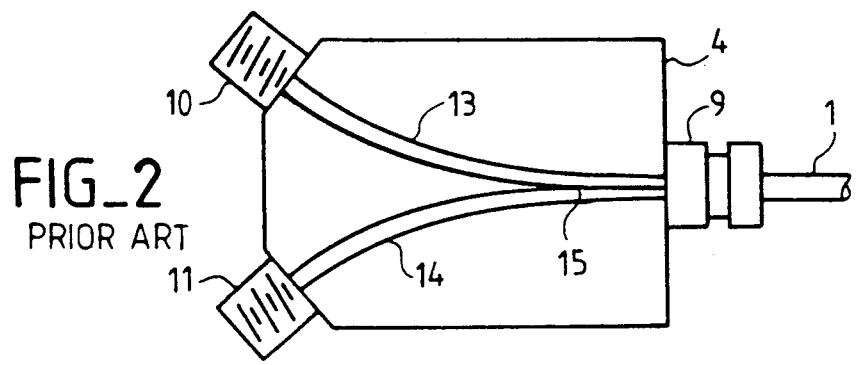
FIG_2
PRIOR ART
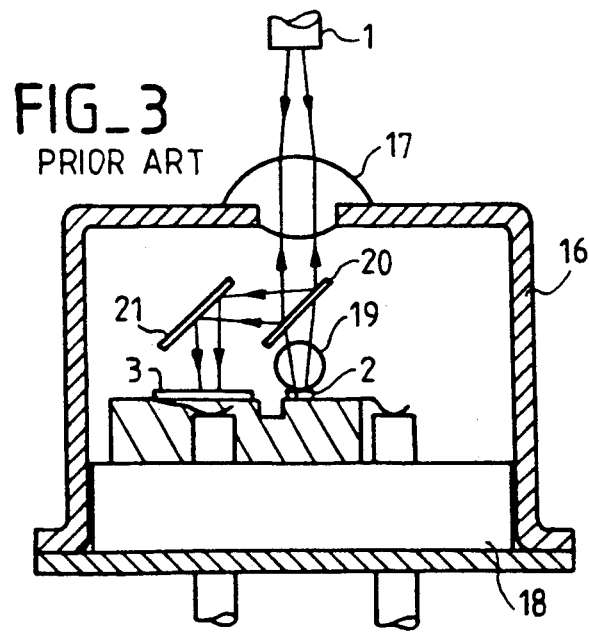
FIG_3
PRIOR ART

FIG_4
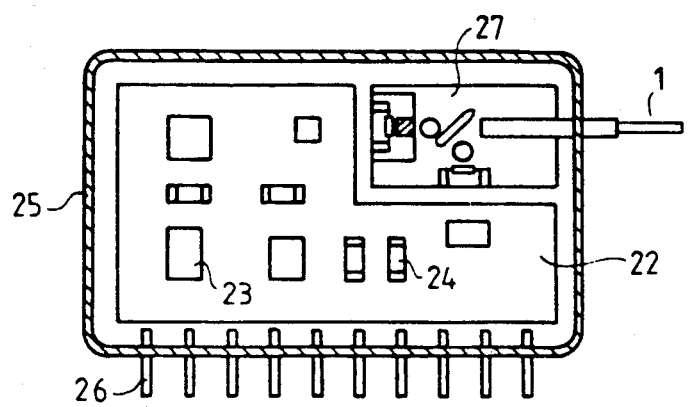
FIG_5
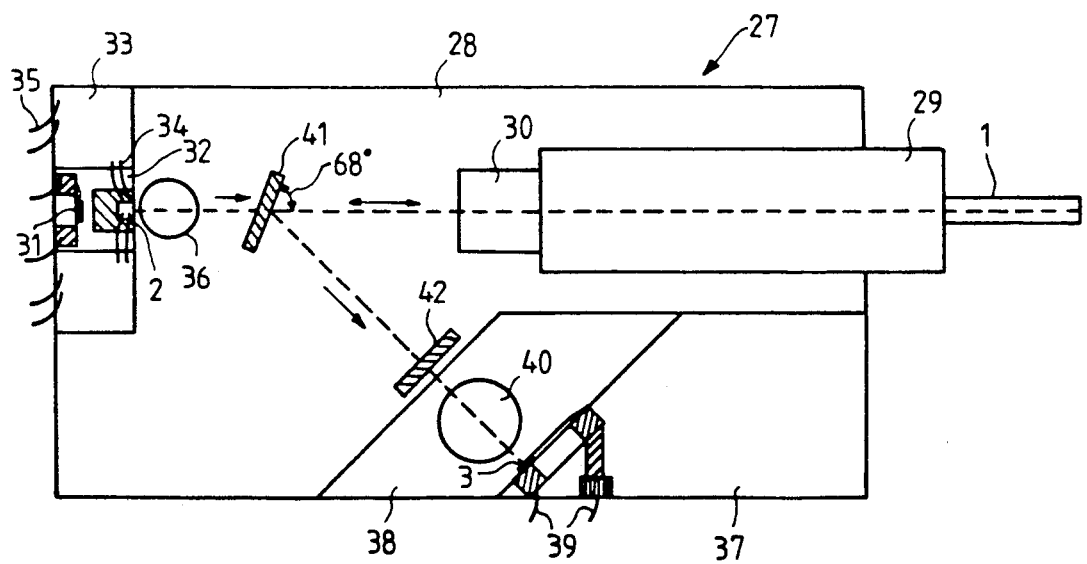

OPTICAL HEAD CAPABLE OF BEING FITTED INTO A HYBRID CIRCUIT

BACKGROUND OF THE INVENTION

1. Field of the Invention The present invention concerns an optical head in hybrid technology, namely an optoelectronic module that enables the emission and reception of light signals, conveyed by a single optic fiber, the module being made by means of hybrid technology, so that it can be directly fitted into a hybrid circuit.

2. Description of the Prior Art

In the single-fiber bidirectional optic link, the single optic fiber transmits the light, emitted by a laser diode placed at a first end of the fiber and received by a photodiode placed at a second end of the fiber, in a first direction that shall be called a forward direction. In the other direction, which shall be called the return direction, the light emitted by a second laser, placed at the second end of the fiber, is received by a second photodiode placed at the first end of the fiber. Therefore, at each end of the optic fiber, there is a laser diode and a photodiode, both of which should be optically linked to that end of the optic fiber which is in their vicinity.

FIG. 1 shows the block diagram of a bidirectional optic fiber termination: the single optic fiber 1 transmits the light received by the photodiode 3 in one direction The respective dimensions of the optic fiber 1 and of the two semiconductors 2 and 3 make it necessary to multiplex the light beam by a duplexer 4, connected to the laser by a fiber section 5 and to the photodiode by a fiber section 6. The blocks 7 and 8 represent, respectively, the electronic circuits for emission and reception of the signals.

The known ways of carrying out this duplexing or optic coupling are fairly bulky as a rule: the couplers are formed by a package, the faces of which support optic connectors. There is at least one connector for the optic fiber, one connector for the laser in its micropackage and one connector for the photodiode in its micropackage. Within the package of the coupler, simple means couple the laser to the optic fiber and the photodiode to the optic fiber. The main drawback of these couplers, which are moreover simple elements, is the amount of space they occupy. Besides, owing to the very small dimensions (50-100 µm) of the optic fibers used in bidirectional systems, the couplers require high machining precision at each connection by connectors.

FIG. 2 shows a simplified sectional view of a prior art duplexer such as this. A package 4 supports three optic connectors 9, 10 and 11. The optic fiber 1 is fixed into the connector 9, and the signals that it conveys are relayed towards the connectors 10 and 11 by means of two fiber sections 13 and 14, coupled in the region 15. The fiber sections 5 and 6 of FIG. 1 are connected to the connectors 10 and 11. This duplexer, which besides is highly efficient, is not capable, in itself, of being fitted into a hybrid circuit, and requires three optic connectors which are known to be difficult to use.

In order to do away with the need for optic connectors, the Applicant has developed and perfected an optic head shown in FIG. 3. This head uses a TO39 type transistor package, available in the market, the cover 16 of which is provided, by construction, with a lens 17. The chips of a laser 2 and of a photodiode 3 are fixed to the base 18 of the transistor package. The light emitted by the laser 2 is focused towards the optic fiber 1 by a spherical lens 19 and by the lens 17 of the package cover. In the emission mode, the semi-transparent mirror 20 does not come into play. In reception, the light transmitted by the optic fiber 1 is reflected by the mirrors 20 and 21 towards the photodiode 3. The assembly is described in detail in the French patent application No. 85 07147 filed on 10th May 1985.

This duplexer is easy and economical to make, but it is three-dimensional: if the base 18 is fixed to a substrate conventionally, the optic fiber 1 is perpendicular to the substrate and, hence, is in an inconvenient position where it is subjected to a risk of breakage. For the optic fiber to be in a plane parallel to that of the substrate, the TO39 package would have to be fixed in a cradle, its axis of symmetry being parallel to the substrate. These techniques are not homogeneous with the technology of hybrid circuits.

SUMMARY OF THE INVENTION

In order to make it possible to fit an optic head into a hybrid circuit, the invention provides for the positioning of the components (optic fiber, laser, diode, lenses etc.) on a plane substrate according to hybrid circuit technology. It is therefore a two-dimensional optic head, if the thickness of the semiconductor chips, the lenses and the optic fiber is taken as being negligible, this thickness being, in any case, of the same order of magnitude as that of the chips of semiconductors or of chip capacitors fixed to a hybrid circuit.

More precisely, the invention concerns an optic head including an optic fiber and at least one semiconductor optoelectronic assembly, emitting or receiving a light beam transmitted by the optic fiber, wherein said optic head is of the hybrid circuit type, the support of the optic fiber and the support of the optoelectronic semiconductor being fixed onto a rigid plane substrate, and being capable of being fitted into a hybrid circuit.

BRIEF DESCRIPTION OF THE DRAWINGS

The invention will be understood more clearly from the description which is now given, with reference to the appended drawings, of which:

FIG. 1 shows a diagram of a single-fiber optic head;

FIG. 2 shows a drawing of a first type of optic duplexer used in the optic head of FIG. 1;

FIG. 3 shows a drawing of a second type of duplexer, the objects of FIGS. 1 to 3 being known and already described here above;

FIG. 4 shows a top view of a hybrid circuit into which an optic head according to the invention is fitted;

FIG. 5 shows an enlarged top view of the optic head according to the invention.

DETAILED DESCRIPTION OF THE INVENTION

The invention can be applied to a plurality of types of optic heads. Depending on the components used, it is a multiplexer (two light-emitting semiconductor components), a demultiplexer (two light-receiving semiconductor components) or a coupler (semi-reflecting plate instead of a dichroic mirror). To make the description clearer, the invention shall be explained with reference to the example of a coupler, or duplexer, without in any way thereby restricting the scope of the invention.

FIG. 4 shows a hybrid circuit including a duplexer according to the invention. A hybrid circuit is very generally a thin, flat object, formed on a substrate 22 which is a wafer of alumina, beryllium oxide or aluminium nitride. Active component chips 23 or passive component chips 24 are attached to this wafer 22, and the interconnections or certain passive components are deposited by thick-layer techniques. In order to protect all these components which are bare, a hybrid circuit is always shielded by a package, the lateral wall of which is shown at 25. The electrical connections are set up by glass-metal type passages 26. The entire package 25 is flat in order to preserve the advantages of SMCs, namely components mounted on the surface of the hybrid circuit.

Under these conditions, it is clear that if an optoelectronic head has to be included in a hybrid circuit, known components such as the ones shown in FIGS. 2 and 3 are not quite appropriate: there is a break in technology. The invention provides a solution to this problem by proposing an SMC (surface-mounted component) type of optoelectronic head, the technology of which remains homogeneous with that of hybrid circuits or printed circuits. It is thus that, in FIG. 4, an optoelectronic head 27, assembled on a plane substrate, is fitted into the hybrid circuit 22. The head 27 according to the invention may be made directly on the plane substrate of the hybrid circuit 22, but it is more efficient, from the viewpoint of factory production, to assemble the head as a macrocomponent on a small independent substrate, test it and then insert it into the hybrid circuit by surface mounting, on the substrate of the hybrid circuit, or beside it as shown in FIG. 4. In this case, the two substrates are adjusted in such a way that the electrical connections can easily be set up by heat-soldered gold wires.

An enlarged top view of the optic head according to the invention is shown in FIG. 5.

All the components of the head 27 are referenced with respect to a plane substrate 28 which serves as a reference plane for optic alignments. This substrate may be ceramic but it is advantageously metallic, i.e. made of gold-plated copper or steel. The metal makes it possible to obtain a very good surface condition and very precise machining operations. Furthermore, a metal plate acts as a heat sink for the semiconductor components. A rectangular shape is best suited to an optic head.

A tube 29 is fixed to this plane wafer 28. It is preferably made of metal, with a length in the range of 1 to 2 cm, and with an internal diameter enabling it to receive, on one side, the optic fiber 1 and, on the other side, a focusing fiber 30 such as an ordinary lens or a lens with index variation. The tube 29 is brazed or bonded to the reference wafer 28.

A first optoelectronic assembly is also fixed to the reference plate 28 and is in the optic axis of the fiber 1: in the case of a duplexer, the semiconductor device is a laser 2. This laser 2 and its reverse feedback photodiode 31 are fixed to an insulator wafer 32, are provided with adequate metallizations for the fastening and electrical supply, which is itself fixed to a first base 33, and are generally made of metal. The total height of the insulator 32 and of the base 33 is such that the optic axis of the laser 2 is very substantially merged with the optic axis of the fiber 1. Gold or aluminium wires 34 and 35 provide for the electrical biasing of the laser 2 and diode 31, in interconnection with the hybrid circuit 22.

In order to focus the light emitted by the laser 2 on the optic fiber 1, a first lens 36 is positioned between the laser and the lens 30. The lens 36 is formed by a spherical glass or sapphire bead, and its diameter of about 1.5 mm corresponds to an accurate alignment between the optic laser 2 and the fiber 1 when the bead 36 is directly bonded to the substrate 28, which serves as a reference plane.

A second optoelectronic unit such as a detection photodiode 3 is positioned laterally with respect to the tube 29 and to the optic fiber 1. In a manner comparable to the laser 2, the photodiode 3 is fixed to an insulator support 37, provided with adequate metallizations for the biasing, this support being itself fixed to a second metal base 38. Gold or aluminium wires 39 lead in the bias voltage of the photodiode, in connection with the hybrid circuit 22. A second spherical lens 40, made of glass or sapphire, with a diameter of the order of 2 mm, is bonded to the metal base 38, facing the photodiode 3.

The light beam emitted by the laser 2, with a wavelength of $\lambda 1$, is directly focused by the lenses 36 and 30 on the optic fiber 1. However, the light beam transmitted by the optic fiber, with a wavelength $\lambda 2$ (coming from an optic source located at the other end of the optic fiber), should be deflected to reach the photodiode 3. To achieve this goal, a plate 41 forming a dichroic mirror is placed on the optic axis of the fiber 1 between the lenses 30 and 36. This dichroic mirror is inclined by 68° with respect to the optic axis. This corresponds to an optimum separation between the wavelengths $\lambda 1$ and $\lambda 2$. The position of the dichroic mirror 41, which is at a variable distance from the lens 30 or the lens 36, is not of vital importance: it enables the second optoelectronic unit to be positioned as efficiently as possible, so as to obtain a compact optic head.

Under these conditions, the light beam with a wavelength $\lambda 1$, emitted by the laser 2, goes through the dichroic mirror 41 without deflection, and is focused on the optic fiber 1. By contrast, the light beam with a wavelength $\lambda 2$ emitted by the optic fiber 1, is deflected by the dichroic mirror 41, towards the lens 40 and the photodiode 3.

To provide for efficient separation between the optic signals, it is preferable to interpose a filter 42 on the path of the deflected ray, before the photodiode 3. This filter 42 is advantageously formed by a second dichroic mirror, identical to the preceding one.

The two dichroic mirrors 41 and 42 have a substantially square or rectangular shape: they are bonded by one edge to the metal wafer 28.

The invention has been explained with reference to the example of a duplexer but, depending on the nature of the optoelectronic semiconductors 2 and 3, it can be applied to other types of optic heads:

a multiplexer: the two semiconductors 2 and 3 are emitters which are laser diodes or electroluminescent diodes;

a demultiplexer: they are two receivers which are photodiodes;

a coupler: in this case, the dichroic mirror is replaced by a semi-reflecting plate.

The optic heads according to the invention are used in systems for the transmission of data by optic fibers.

What is claimed is:

1. An optic head for use in a hybrid circuit comprising:
    an optic fiber;
    at least one first semiconductor optoelectronic assembly for emitting or receiving a light beam transmitted by the optic fiber;

a support for the optic fiber and the first semiconductor optoelectronic assembly, said support being a rigid plane substrate;

a second semiconductor optoelectronic assembly placed outside an optic axis of said optic fiber;

a means for deflecting a light beam output by said optic fiber towards said second optoelectronic assembly, said second semiconductor optoelectronic assembly and said deflection means being fixed onto the rigid plane substrate.

2. An optic head according to claim 1, wherein the rigid plane substrate is a polished, metal plate.

3. An optic head according to claim 1, wherein the optic fiber is fixed onto the rigid plane substrate by brazing or bonding; and further comprising a focusing lens attached at an end of said optic fiber which faces the first semiconductor optoelectronic assembly.

4. An optic head according to claim 1, wherein the first semiconductor optoelectronic assembly is fixed to an insulator wafer which is itself fixed to a first metal wafer brazed to the rigid plane substrate; and further comprising a first spherical lens, made of glass or sapphire, bonded to the rigid plane substrate between the first semiconductor optoelectronic assembly and the optic fiber.

5. An optical head according to claim 1, wherein the second semiconductor optoelectronic assembly is fixed to an insulator wafer which is itself fixed to a second metal wafer brazed to the rigid plane substrate; and further comprising a second spherical lens, made of glass or sapphire, bonded to the second metal wafer in front of the second semiconductor optoelectronic assembly.

6. An optic head according to claim 1, wherein the means for deflecting the light beam is formed by a dichroic mirror which lets through a light beam of a first wavelength towards the first semiconductor optoelectronic assembly without deflection, and which reflects a light beam of a second wavelength towards the second semiconductor optoelectronic assembly.

7. An optic head according to claim 1, further comprising a dichroic mirror type filter interposed on a path of a beam deflected by said deflecting means, in front of the second semiconductor optoelectronic assembly.

8. An optic head according to either of claims 6 or 7, wherein the deflection means and the dichroic mirror type filter are plates, bonded at their edges to the rigid plane substrate.

9. An optic head according to claim 1, wherein the optic head operates as a duplexer, in which the first semiconductor optoelectronic assembly is a laser and the second semiconductor optoelectronic assembly is a photodiode.

10. An optic head according to claim 1, wherein the optic head operates as a multiplexer, in which the first and second semiconductor optoelectronic assemblies are lasers.

11. An optic head according to claim 1, wherein the optic head operates as a demultiplexer, in which the first and second semiconductor optoelectronic assemblies are photodiodes.

12. An optic head according to claim 1, wherein the optic head operates as a coupler, in which the deflection means is a semi-reflecting plate.

* * * * *